United States Patent [19]

Brown

[11] Patent Number: 5,049,197
[45] Date of Patent: Sep. 17, 1991

[54] MAGNESIUM CEMENT COMPOSITION WITH PARTICULATE FIBROUS MATERIAL

[75] Inventor: Graham K. Brown, McMasters Beach, Australia

[73] Assignee: Magnatex Industries Pty. Limited, Australia

[21] Appl. No.: 478,004

[22] PCT Filed: Sep. 16, 1988

[86] PCT No.: PCT/AU88/00365
§ 371 Date: Apr. 19, 1990
§ 102(e) Date: Apr. 19, 1990

[87] PCT Pub. No.: WO89/02422
PCT Pub. Date: Mar. 23, 1989

[30] Foreign Application Priority Data

Sep. 21, 1987 [AU] Australia .................. PI 4466

[51] Int. Cl.$^5$ .............................................. C04B 9/02
[52] U.S. Cl. .................................. 106/685; 106/688; 106/805; 106/687
[58] Field of Search ............... 106/687, 688, 805, 108, 106/685

[56] References Cited

U.S. PATENT DOCUMENTS

| 1,965,538 | 7/1934 | Stewart | 106/685 X |
| 3,667,978 | 6/1972 | Vassilersky et al. | 106/687 X |
| 3,788,870 | 1/1974 | Verth et al. | 106/687 |

FOREIGN PATENT DOCUMENTS

| 702720 | 4/1931 | France . |
| 1124692 | 4/1956 | France . |
| 1116709 | 5/1956 | France . |
| 236450 | 6/1925 | United Kingdom . |
| 252906 | 6/1926 | United Kingdom . |
| 249899 | 3/1929 | United Kingdom . |
| 1341711 | 12/1973 | United Kingdom . |

Primary Examiner—Karl Group
Attorney, Agent, or Firm—Roylance, Abrams, Berdo & Goodman

[57] ABSTRACT

A settable magnesium cement composition, useful for floor leveling or for the preparation of molded products, has a two part mix. The first part includes magnesium oxide, while the second part includes magnesium chloride component and a particulate fibrous material compound, ideally a coarse, fibrous long-stranded sawdust, known as green fibrous sawdust, having a moisture content of about 40–50% by weight.

15 Claims, No Drawings

MAGNESIUM CEMENT COMPOSITION WITH PARTICULATE FIBROUS MATERIAL

TECHNICAL FIELD

This invention relates to a composition of matter and more particularly to such a composition useful for the manufacture of building products.

BACKGROUND ART

Settable magnesium cement (sorels cement) compositions are known, and such compositions containing sawdust filler are also known and have previously been used as settable flooring or floor-leveling compositions.

Such compositions generally comprise a mixture of magnesium oxide/magnesium chloride with sawdust or other suitable particulate filler. However, the quality and moisture content of the sawdust is of importance, otherwise the floor may break up, or become chalky and eventually crumble. The water content of the finely-comminuted sawdust component was required to be of less than 12%. It proved to be not easy to maintain this moisture percentage and it was found that higher moisture content gave rise to several problems such as the composition's not setting properly, the reaction not going to completion, and the like. Moreover, the presence of "free" magnesium chloride has been found to cause so-called "sweating". Also, the possibility of corrosion has undoubtedly existed when the composition came into contact with, say, steel or aluminium, usually in the form of door jambs or window sills, rusting steel and corroding aluminium.

DISCLOSURE OF INVENTION

It is thus an object of the present invention to overcome the above and other disadvantages by the provision of a composition of matter, particularly a settable flooring composition, comprising a two-part mix; the first part thereof comprising magnesium oxide, and the other part thereof comprising a magnesium chloride component and a particulate fibrous material component.

Optionally, the mix may comprise additives to reduce any tendency for the mix to corrode metal fittings which may come into contact with the mix, including sodium metasilicate, zinc sulfate and aluminium sulfate.

Preferably, a coarse, fibrous long-strand sawdust—known as "green fibrous sawdust"—is employed as the particulate fibrous material component, the sawdust advantageously having a moisture content of about 40-50%, preferably 40-45%, by weight.

In order that the reader may gain a better understanding of the present invention, hereinafter will be described a preferred embodiment thereof, with reference to the following Example:

BEST MODE FOR CARRYING OUT THE INVENTION

Example

A settable flooring composition, comprising a two-part mix, was prepared. The proportions of the components were as follows:

First Part: magnesium oxide
Second Part:
 (i) coarse, fibrous long-strand sawdust; 40-45% moisture - 29 parts by weight.
 (ii) magnesium chloride crystals; 96%-14 parts by weight.
 (iii) Optionally
    (a) Lanasyn Black dye
    (b) Sodium metasilicate 450 gm
    (c) Zinc sulfate 450 gm
    (d) Aluminium sulfate 450 gm.

The magnesium oxide of the first part was made up into 20 Kg bags, and the components of the second part were premixed and made up into 21 Kg. bags. Once on site, two of the 21 Kg, mixed-component bags were mixed with one 20 Kg bag of magnesium oxide. Sufficient water was added and mixed in well so that the composition was damp throughout but still "crumbly". Excess water will weaken the final product.

If required, to assist adhesion, the area to be coated can be primed with a PVA solution or a dilute magnesium cement slurry. In this example, the area to be coated was wetted using one part of a suitable priming solution (e.g. 'MAGNAPRIME') to two parts of water. While the area was still wet, the inventive composition was spread evenly over it and screeded to a slightly higher level than the desired finished surface, using a timber straight edge. The laid composition was then trowelled down and compacted evenly with a conventional boat-shaped steel trowel.

Generally, the flooring composition has cured sufficiently by the following day to be able to be walked on, although seven days or more should be allowed before a floor covering is laid on the surface.

The inventive composition requires about 50% less magnesium chloride than does the above-described three-part mix and consequently there is less "free" magnesium chloride to cause the so-called "sweating"; moreover, the product is less expensive as a result.

There is some evidence to suggest that a chemical reaction occurs in the pre-mixture of magnesium chloride and fibrous material, to give better, more even penetration or mixing. The inventive settable composition produces a more durable, harder, stronger floor due to better bonding of the fibrous material, the long strands assisting in the provision of these qualities.

The finished settable composition is light in weight (about one-third the weight of concrete); non-toxic; sound-attenuating; vermin-proof; it is resistant to oil and solvents; and it is a non-conductor of electricity.

Many other advantages ensue from compositions of matter according to the present invention, which is also envisaged to encompass the process of producing the inventive compositions.

INDUSTRIAL APPLICABILITY

Thus the inventive process:
 (a) gives a better control of mixing and packaging, better control over product quality, and more consistent results:
 (b) offers ease and simplification of application:
 (c) reduces dust problems—the prior art process, using finely-comminuted dry sawdust and dry magnesium oxide, created clouds of dust during the time in which the components were being mixed:
 (d) gives a more uniform colour—which is, in turn, more aesthetically pleasing—as a result of the more intimate mixing which is possible—; the prior art process gave lack of uniformity with colour variations being visible on different areas of the floor:
 (e) offers ease and convenience in transportation, due to there being only two parts with the second part having the magnesium chloride content halved for a given application:

(f) can be adapted to the manufacture of various moulded products such as wall panels, ceiling and other tiles, pavers, and the like:

(g) can be adapted to the use of other fibrous material instead of, or in addition to, long wood fibres—for example, rice husks; this facet of the invention makes it particularly useful in the manufacture of low-cost building products in such as Asian countries.

Settable compositions as described above can be laid at any thickness down to a feather edge and provide a smooth level surface which, when cured, can be sawn, routed, stapled, nailed, screwed, or otherwise formed according to requirements. The surface is suitable for the laying of carpet, the adhesion of vinyl, linoleum, etc. and, when suitably sealed, may be used in wet areas such as bathrooms, laundries and kitchens.

From the abovegoing, it will be readily appreciated by those skilled in the art that numerous variations and modifications may be made to the invention without departing from the spirit and scope thereof, as defined in the appended claims.

I claim:

1. A settable magnesium cementitious composition for use as a flooring composition or for the preparation of molded products, said cementitious composition comprising a two-part mix;

a first part of the mix comprising magnesium oxide; and a second part of the mix including a magnesium chloride component and a particulate fibrous material component, the magnesium chloride component being composed of 14 parts by weight of magnesium chloride crystals, the particulate fibrous material being 29 parts by weight of coarse, fibrous long-strand sawdust having a moisture content of about 40 to 50 percent by weight;

said first and second parts being mixed together in a weight ratio of about 20:21 first part to second part.

2. A settable magnesium cementitious composition according to claim 1 wherein said second part further includes at least one selected from the group consisting of sodium metasilicate, zinc sulfate and aluminium sulfate.

3. A settable magnesium cementitious composition according to claim 2 wherein the magnesium oxide of the said first part, and the components of the said second part are mixed together on site, said components of the second part being pre-mixed beforehand.

4. A settable magnesium cementitious composition according to claim 1 wherein the magnesium oxide of the said first part, and the components of the said second part are mixed together on site, said components of the second part being pre-mixed beforehand.

5. A settable magnesium cementitious composition according to claim 1 wherein said magnesium chloride crystals are 96 percent pure by weight.

6. A settable magnesium cementitious composition according to claim 1 used as a flooring composition.

7. A settable magnesium cementitious composition according to claim 2 used as a floor composition.

8. A settable magnesium cementitious composition according to claim 3 used as a flooring composition.

9. A settable magnesium cementitious composition according to claim 4 used as a floor composition.

10. A settable magnesium cementitious composition according to claim 5 used as a floor composition.

11. A settable magnesium cementitious composition according to claim 1 used for preparing a molded product.

12. A settable magnesium cementitious composition according to claim 2 used for preparing a molded product.

13. A settable magnesium cementitious composition according to claim 3 used for preparing a molded product.

14. A settable magnesium cementitious composition according to claim 4 used for preparing a molded product.

15. A settable magnesium cementitious composition according to claim 5 used for preparing a molded product.

* * * * *